US006854001B2

(12) United States Patent
Good et al.

(10) Patent No.: US 6,854,001 B2
(45) Date of Patent: Feb. 8, 2005

(54) APPARATUS AND METHOD FOR SIMULTANEOUSLY DISPLAYING A NUMBER ALONG WITH ITS NUMBER OF SIGNIFICANT FIGURES

(75) Inventors: John C. Good, Greenfield, NH (US); Shawn Prestridge, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 603 days.

(21) Appl. No.: 10/013,992

(22) Filed: Dec. 11, 2001

(65) Prior Publication Data

US 2003/0115231 A1 Jun. 19, 2003

(51) Int. Cl.[7] .............................................. G06F 3/14
(52) U.S. Cl. ..................................... 708/174; 708/513
(58) Field of Search .............................. 708/174, 171, 708/513

(56) References Cited

U.S. PATENT DOCUMENTS

| | | | | | |
|---|---|---|---|---|---|
| 4,225,932 A | * | 9/1980 | Hirano et al. | ............... | 708/162 |
| 4,279,022 A | * | 7/1981 | Abe | ........................... | 708/110 |
| 4,847,802 A | * | 7/1989 | Ashton | ....................... | 708/513 |
| 5,289,394 A | * | 2/1994 | Lapeyre, deceased | ...... | 708/142 |
| 5,377,130 A | * | 12/1994 | Frank et al. | ................ | 708/142 |
| 5,768,164 A | * | 6/1998 | Hollon, Jr. | .................. | 708/174 |
| 6,044,392 A | * | 3/2000 | Anderson et al. | .......... | 708/551 |

* cited by examiner

Primary Examiner—D. H. Malzahn
(74) Attorney, Agent, or Firm—J. Dennis Moore; W. James Brady, III; Frederick J. Telecky, Jr.

(57) ABSTRACT

A computing device (40) comprises an electrical circuit and a software application. A display screen (138) and an input device (140) are electrically coupled to the electrical circuit. The software application provides instructions to determine the number of significant figures for a number entered via the input device, and simultaneously display on the display screen the entered number along with the number of significant figures for the entered number, and/or the software application provides instructions to calculate a floating point answer for a mathematical operation entered for one or more numbers entered into the computing device, round the floating point answer to the proper precision or to the proper number of significant figures, determine the number of significant figures for the rounded answer, and simultaneously display on the display the rounded answer and its number of significant figures.

28 Claims, 6 Drawing Sheets

APPARATUS AND METHOD FOR SIMULTANEOUSLY DISPLAYING A NUMBER ALONG WITH ITS NUMBER OF SIGNIFICANT FIGURES

FIELD OF THE INVENTION

The present invention generally relates to computing devices and more specifically to an apparatus and method for simultaneously displaying a number along with its number of significant figures.

BACKGROUND OF THE INVENTION

Calculators, as well as handheld computing devices, laptops, and desktop computers, typically display the results of a mathematical operation with as many digits as the device's display will allow. Hence, such devices assume that entered values for the mathematical operation are exact quantities having infinite precision. However, this assumption is incorrect if one or more of the values entered is based on a measurement, which has a finite precision.

For example, if the mathematical operation of 253.7÷7.64 is entered on a common calculator, the floating point answer displayed is 33.20680628. Even though the first operand (253.7) has only four significant digits or significant figures and the second operand (7.64) has only three significant figures, the floating point answer (33.20680628) is displayed with ten significant figures. If the first operand (253.7) and the second operand (7.64) are both measured quantities, then the proper number of significant figures for the answer to the mathematical operation is three—corresponding to the least number of significant figures for the operands in this example. In other words, the answer in this example should be rounded to 33.2 to reflect three significant figures. Thus, a person who does not understand the concept of significant figures may be misled to believe that the floating point answer reflects the actual level of precision of the answer.

As another example, if a first operand is a measured quantity of 23.625 and the second operand is a measured quantity of 3.0125 for a mathematical operation of 23.625+3.0125, a typical calculator will display a floating point result of 26.6375. Note that the floating point result has a precision to the $1/10,000$ place. However, the least precise operand of the mathematical operation is the first operand (23.625), which has a precision to the $1/1,000$ place. Hence, the properly rounded answer is 26.638—rounded to a precision of $1/1,000$—corresponding to the least precise measured value. Thus, again, a person who does not understand the concept of rounding to the least precision for mathematical operations involving measured values may be mislead to believe that the floating point answer reflects the actual level of precision of the answer. Hence, there is a need for a tool that will automatically perform the proper rounding of an answer to a mathematical operation involving measured values, and that will inform or remind the user that the number has been rounded accordingly.

The concept of rounding a result of a mathematical operation to the proper precision or to the proper number of significant figures is a known concept. In applying the rules for rounding to the proper number of significant figures, the following rules are used to determine the correct number of significant figures for values in standard decimal notation (as opposed to scientific notation described further below):

| Rule | Example Value | Number of Significant Figures for Example Value |
|---|---|---|
| Nonzero digits are always significant. | 11 | 2 |
| | 5.759 | 4 |
| Zeros between nonzero digits are significant. | 10.05 | 4 |
| | 90005 | 5 |
| Zeros in front of nonzero digits are not significant. | 0.0003 | 1 |
| | 0.0509 | 3 |
| Zeros at the end of a number to the right of a decimal point are significant. | 23 | 2 |
| | 23.0000 | 6 |
| Zeros at the end of a whole number are significant only if the decimal point is shown. | 46000 | 2 |
| | 46000. | 5 |

The rule used to determine the correct number of significant figures for values in scientific notation is that only significant figures are included when writing a number in scientific notation. For example, $3 \times 10^6$ has one significant figure, and $3.00 \times 10^6$ has three significant figures.

For a mathematical operation not having an addition or subtraction operation involved, the answer to the mathematical operation is rounded to the least number of significant figures corresponding to the measured value in the mathematical operation having the least number of significant figures. Such mathematical operations include multiplication and division. Squaring (e.g., $5^2=25$) operations, which are essentially multiplication, and other operations raising a value to a power, are also included. For example in the mathematical operation of $12.257 \times 1.36$ (assuming all operands are measured values), the floating point answer is 16.66952. The first operand (12.257) has five significant figures and the second operand (1.36) has three significant figures. Hence, the operand with the least number of significant figures is the second operand having three significant figures. Thus, the answer rounded to the least number of significant figures (i.e., rounded to three significant figures) is 16.7.

For a mathematical operation having an addition and/or subtraction operation involved, the answer to the mathematical operation is rounded to the precision of the least precise value of the measured operands. For example in the mathematical operation of 3.95+213.6+2.879 (assuming all operands are measured numbers), the floating point answer is 220.429. The first operand (3.95) is precise to hundredths ($1/100$), the second operand (213.6) is precise to tenths ($1/10$), and the third operand (2.879) is precise to thousandths ($1/1000$). Hence, the least precise operand of the mathematical operation is the second operand, which is precise to the nearest tenth. Thus, the floating point answer (220.429) should be rounded to the nearest tenth, which yields a rounded answer of 220.4. As another example, 29000+6.0 (assuming each operand is a measured value) yields a floating point result of 29006. Because the first operand (29000) is precise to thousands (1000) and the second operand is precise to tenth ($1/10$), the properly rounded answer will be 29000 (rounded to the nearest thousands—the least precise of the mathematical operation).

For mixed mathematical operation on one or more measured values involving addition and/or subtraction as well as multiplication, division, and/or raising a number to a power, the final result is rounded according to the addition and subtraction rules (least precision) described above. In such a mixed mathematical operation, there is a default order to performing the mathematical operations, unless another order is specified. First, the multiplication, division, and/or raising a number to a power operations are performed within each group separated by an addition or subtraction operation. Second, the results of each group are added and/or subtracted accordingly. The floating point (unrounded) result for each group is maintained for the calculations and only the final result is rounded.

For example in the mixed mathematical operation of 12÷4.103+2.31×94.8 (assuming each operand is a measured value), the floating point answer is 221.9126893. The first operand (12) is precise to ones and has two significant figures, the second operand (4.103) is precise to the thousandths ($1/1000$) and has four significant figures, the third operand (2.31) is precise to hundredths ($1/100$) and has three significant figures, and the fourth operand (94.8) is precise to the tenths ($1/10$) and has three significant figures. Thus the properly rounded answer (according to the least precise operand—the first operand) is 222, which is precise to the nearest ones and happens to have three significant figures. Therefore, the answer is rounded to the nearest ones according to the addition and subtraction rules, and the answer has three significant figures, even though the least number of significant figures among the operands was two significant figures.

When an exact value is involved in a mathematical operation, its number of significant figures does not affect the proper rounding of the answer. For example, in taking the average of three measured values 3.473, 23.937, and 102.54, the sum of these values is divided by three because there are exactly three values being averaged. Hence, the operand 3 in the mathematical operation does not affect the resulting precision of the properly rounded answer because it is an exact number. Hence, the resulting answer should be rounded to the nearest hundredths ($1/100$) because the least precise measured value (102.54) is precise to hundredths. Therefore, the properly rounded answer is 43.32. Note that these methods of rounding the result of a mathematical operation based on the significant figures and/or precision of the operands are merely conventions to express results with the appropriate precision based upon the precision of the measured values, rather than firm rules. Hence, these methods may vary slightly.

Because these rules for rounding an answer for a mathematical operation involving one or more measured values are more easily understood through examples, there is a need for an education tool that will display the number of significant figures for each operand entered. Such a display can illustrate to the user, or reassure the user, of the number of significant figures for each operand, which may aid in the education process. Also, there is a need for an education tool that will determine and display a properly rounded answer to a mathematical operation involving one or more measured values. Such a tool can illustrate or reassure the user of the properly rounded answer, which may also aid in the educational process.

BRIEF SUMMARY OF THE INVENTION

The problems and needs outlined above are addressed by the present invention. In accordance with one aspect of the present invention, a computing device is provided. The computing device comprises an electrical circuit, a display screen, an input device, and a software application. The electrical circuit comprises a processor and a memory device electrically coupled to the processor. The display screen and the input device are electrically coupled to the electrical circuit. The software application is stored in the memory device. When executed by the processor, the software application is adapted to provide instructions to determine the number of significant figures for a number entered via the input device, and simultaneously display on the display screen the entered number along with the number of significant figures for the entered number.

The computing device may be a calculator. For a calculator, the display screen may comprise a liquid crystal display device, and the input device may comprise a keypad on the calculator. The computing device may be a handheld portable computing device. For a handheld portable computing device, the display screen may comprise a liquid crystal display device, an active matrix display device, or a touch sensitive screen. For a handheld portable computing device with a touch sensitive screen, the input device may comprise a simulated keypad displayed on the touch sensitive screen so that a user can input a number or mathematical operator by contacting the touch sensitive screen with a touch wand or a finger. The computing device may be a laptop computer or a desktop computer. For a desktop computer, the display screen may comprise a cathode ray tube device, and the input device may comprise a keyboard device. The display screen may comprise a television. The computing device may comprise a server and a terminal, and the computing device may be structured in an application service provider (ASP) model such that the terminal is remotely located from the server, the display screen and input device are parts of the terminal, the electrical circuitry is part of the server, and the display screen and input device are electrically coupled to the electrical circuit via a network connection. The network connection may comprise the Internet and/or a local area network (LAN). The memory device may comprise a flash memory device, a hard drive, and/or a synchronous dynamic access memory (SDRAM) device.

The software application may be further adapted to provide instructions to determine the number of significant figures for a second number entered via the input device, and simultaneously display on the display screen the second entered number along with the number of significant figures for the second entered number. Also, the software application may be adapted to provide instructions to calculate a floating point answer for a mathematical operation entered, wherein the entered numbers are the operands, determine the proper number of significant figures for the floating point answer based on the number of significant figures for each of the operands, round the floating point answer to the proper number of significant figures for the answer, and simultaneously display on the display screen the rounded answer along with the number of significant figures for the rounded answer. Furthermore, the software application may be further adapted to provide instructions to simultaneously display the floating point answer on the display screen along with the rounded answer and the number of significant figures for the rounded answer. Also, the software application may be adapted to provide instructions to calculate a floating point answer for a mathematical operation entered, wherein the entered numbers are the operands, determine which of the operands is least precise, round the floating point answer to least precision of the operands, determine the number of significant figures for the rounded answer, and simultaneously display on the display screen the rounded answer along with the number of significant figures for the rounded answer.

In accordance with another aspect of the present invention, a computer program adapted to be executed by a computing device is provided. The computer program comprises a method of displaying an answer for a mathematical operation on a display screen of a computing device. The method comprises the following steps, the order of which may vary: calculating a floating point answer for a mathematical operation entered for one or more numbers entered into the computing device, (i) if there is an addition and/or subtraction operation within the entered mathematical operation, determining the proper precision for the floating point answer based on the entered numbers, (a) rounding the floating point answer to the proper precision, (b) determining the number of significant figures for the rounded answer, and (c) simultaneously displaying on the display screen the rounded answer and the number of significant figures for the rounded answer, and (ii) if there are no addition or subtraction operations within the entered mathematical operation, (a) determining the proper number of significant figures for the floating point answer based on the entered numbers, (b) rounding the floating point answer to the proper number of significant figures, and (c) simultaneously displaying on the display screen the rounded answer and the number of significant figures for the rounded answer.

The method may further comprise the steps of: (iii) determining the number of significant figures for a first number entered into the computing device; (iv) simultaneously displaying on the display screen the first entered number along with the number of significant figures for the first entered number; (v) determining the number of significant figures for a second number entered into the computing device; and (vi) simultaneously displaying on the display screen the second entered number along with the number of significant figures for the second entered number. Also, the method may further comprise the step of simultaneously displaying on the display screen the floating point answer along with the rounded answer and the number of significant figures for the rounded answer.

In accordance with yet another aspect of the present invention, a computer program adapted to be executed by a computing device is provided, wherein the computer program comprises a method of displaying an entered number on a display screen of a computing device. The method comprises the following steps: (i) determining the number of significant figures for a number entered into the computing device; and (ii) simultaneously displaying on the display screen the entered number along with the number of significant figures for the entered number.

BRIEF DESCRIPTION OF THE DRAWINGS

Other objects and advantages of the invention will become apparent upon reading the following detailed description and upon referencing the accompanying drawings, in which.

DETAILED DESCRIPTION OF THE INVENTION

Figure 1:
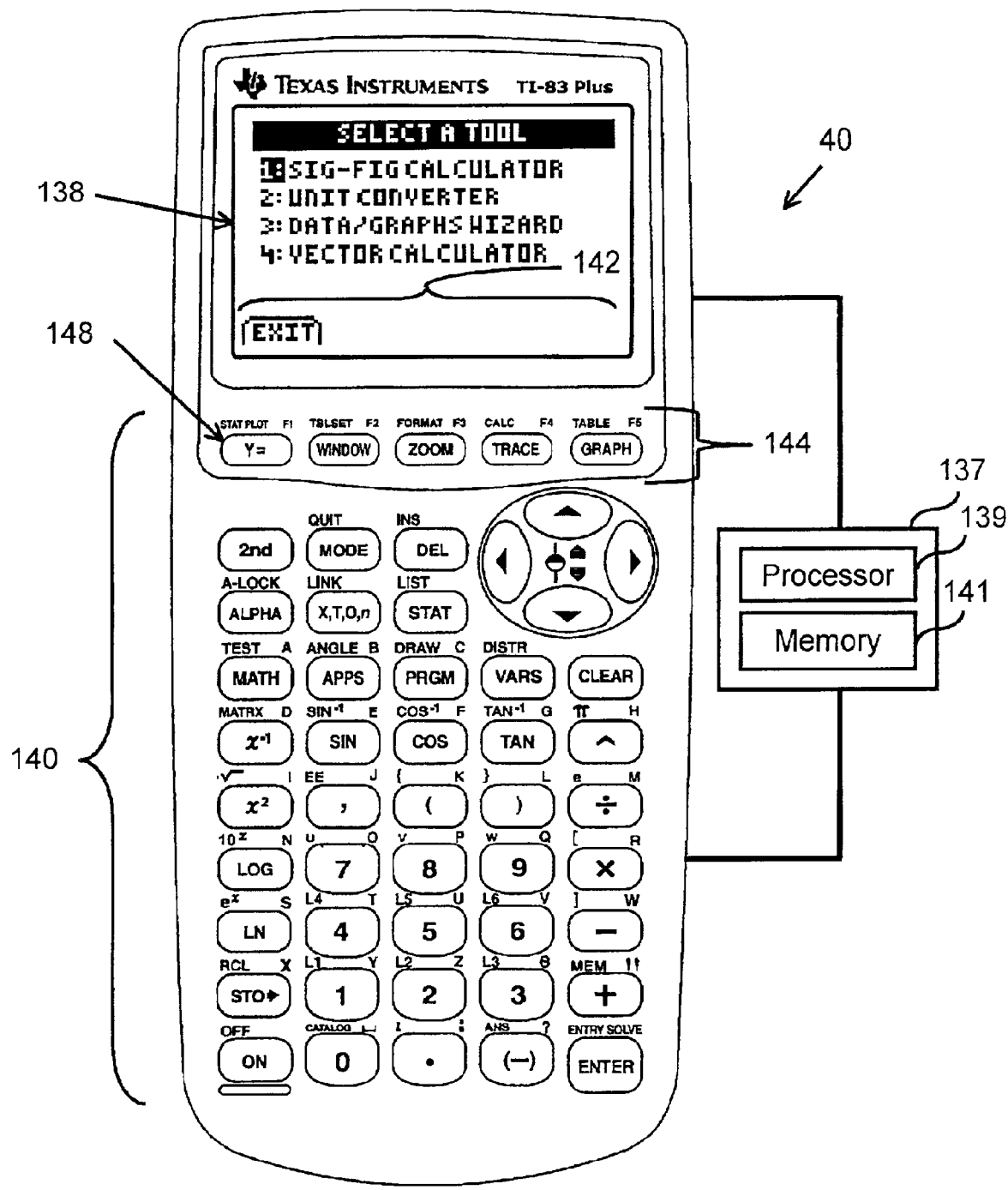
FIG. 1 is a drawing of a calculator in accordance with a preferred embodiment of the present invention.

Referring now to the drawings, wherein like reference numbers are used herein to designate like elements throughout the various views, a preferred embodiment of the present invention is illustrated and described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention.

The present invention provides a way to determine the number of significant figures for a number entered via the input device, and to simultaneously display on a display screen the entered number along with the number of significant figures for the entered number. In another aspect, the present invention provides a way to properly round an answer to a mathematical operation involving one or more measured values according to the precision or number of significant figures of operands that are measured, and to simultaneously display the rounded answer along with the number of significant figures for the rounded answer.

The following description and FIGS. 1–24 pertain to a preferred embodiment of the present invention. FIG. 1 illustrates the preferred embodiment discussed herein, which is a portable, handheld calculator 40 having a software application loaded in its memory. In this example, the calculator 40 is a TI-83 Plus produced by Texas Instruments, Inc. However, the present invention may be incorporated into a different model and/or a calculator made by another company. The preferred embodiment discussed herein is but one illustrative example of the use of the present invention and does not limit the scope of the invention to the preferred embodiment described. The present invention may be embodied in many different computing devices. For example, the present invention may be a software application adapted to run on (but is not limited to) a desktop computer (not shown), a palm-size computing device (not shown), a laptop computer (not shown), or a server connected to a terminal via a network connection (not shown).

Figure 2:
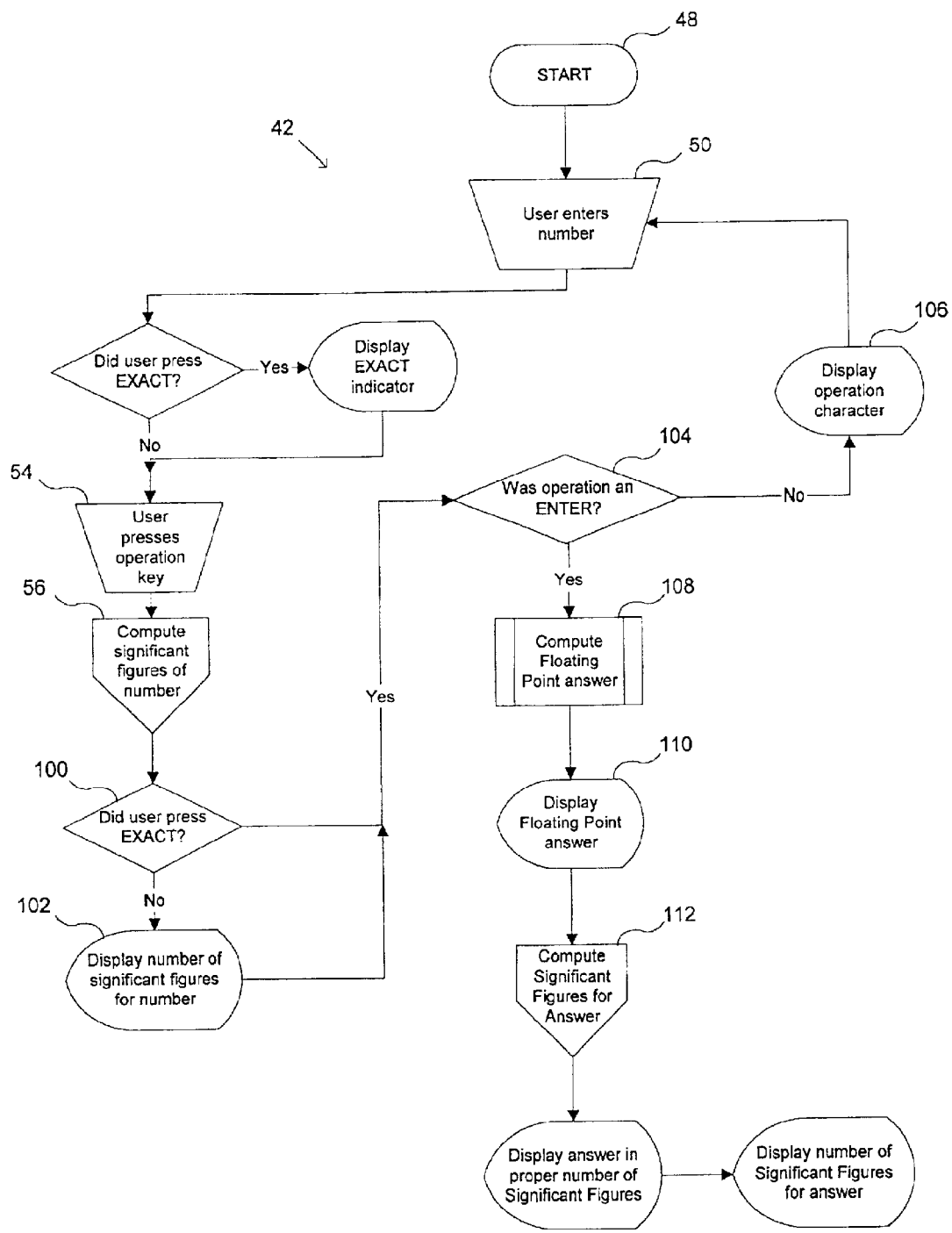
FIG. 2 is a flowchart showing a main process logic and instructions provided by a software application for the calculator of FIG. 1.
Figure 3:
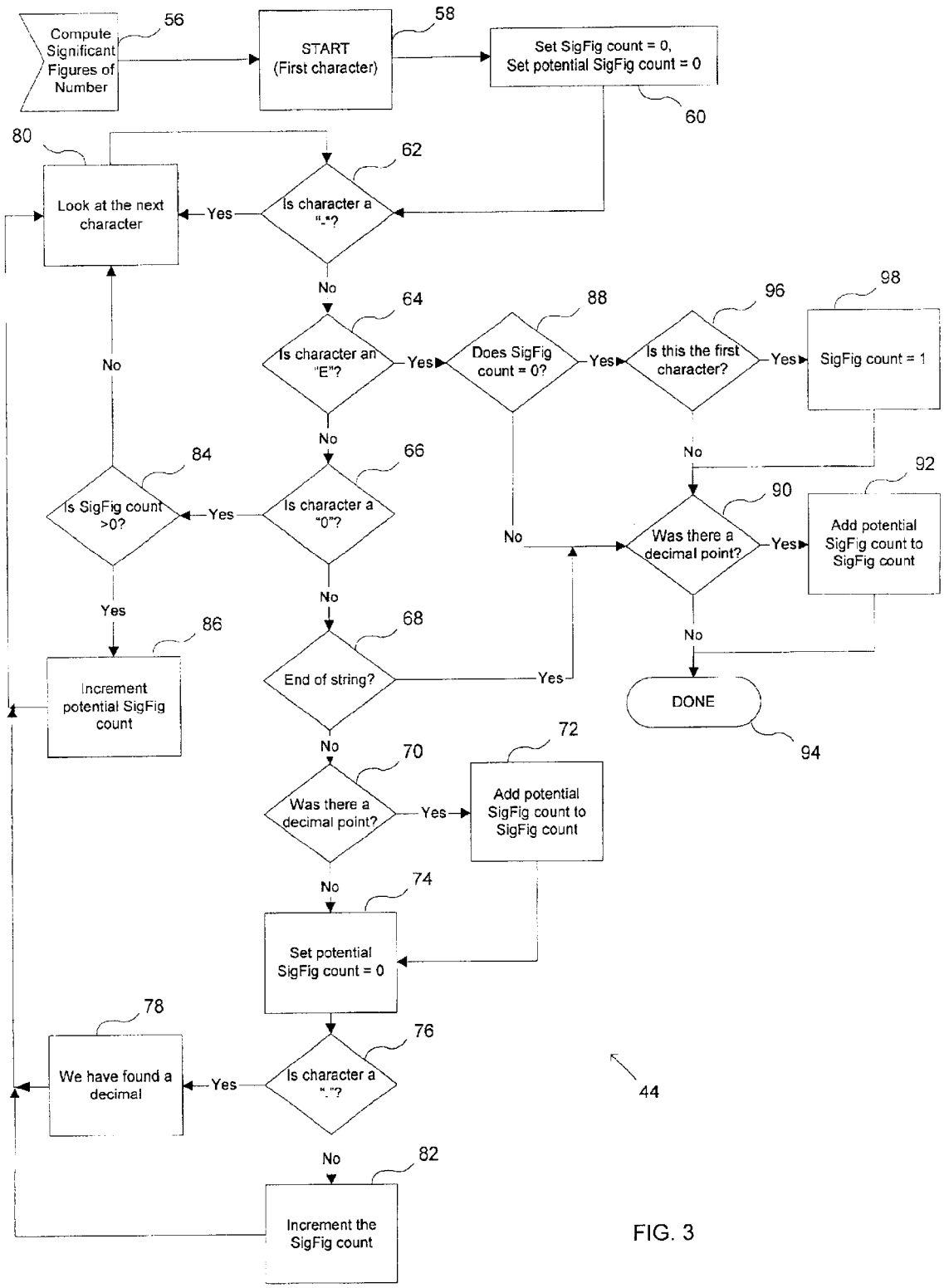
FIG. 3 is a flowchart showing a subroutine of the main process of FIG. 2 for computing the significant figures of a number.
Figure 4:
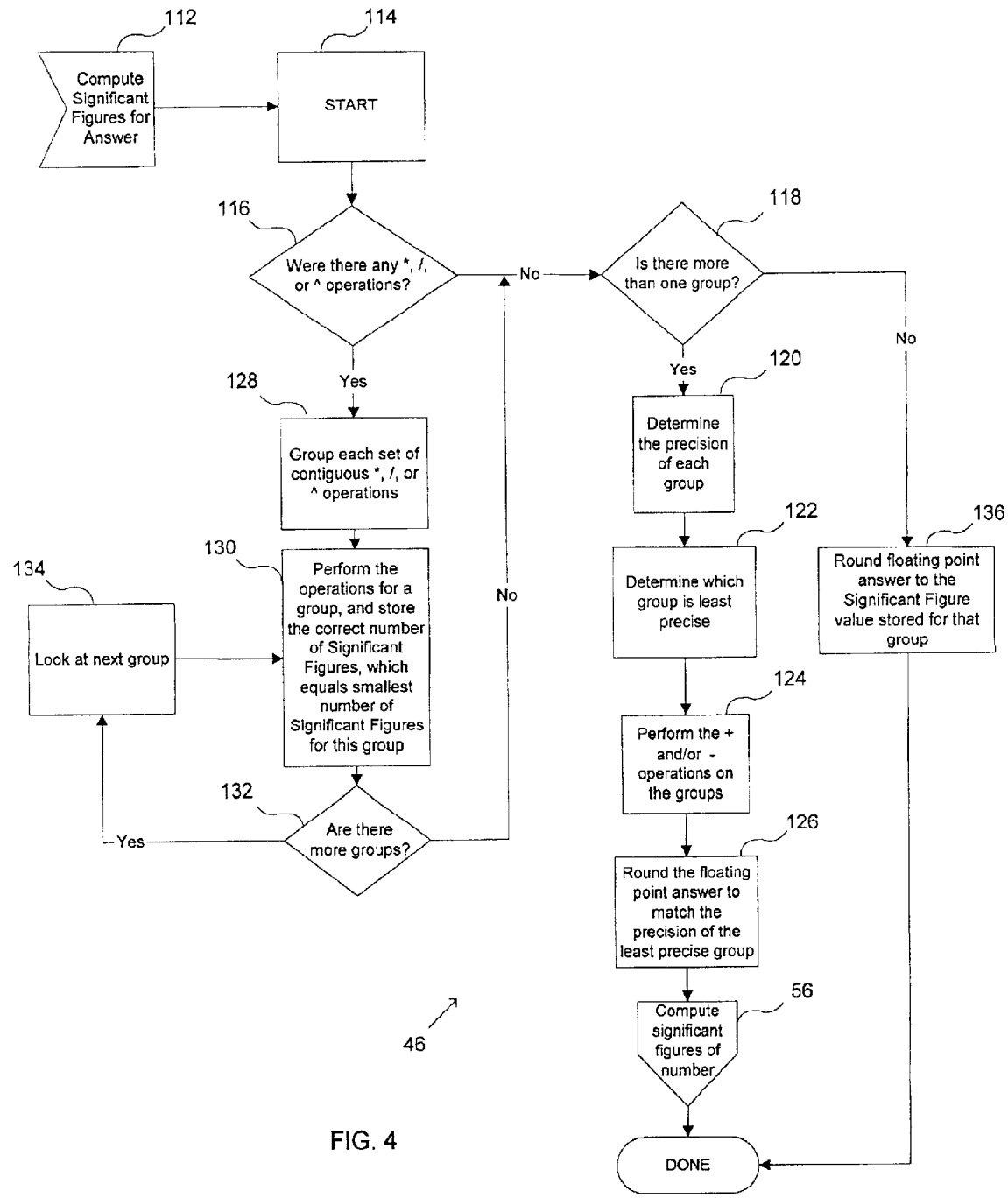
FIG. 4 is a flowchart showing a subroutine of the main process of FIG. 2 for rounding an answer and computing the significant figures for the rounded answer.

FIGS. 2–4 are pseudo code flowcharts illustrating the process logic and instructions provided by the software application for the preferred embodiment. The particular computer language used to implement the logic and instructions shown in FIGS. 2–4 may vary, depending on the programmer's preference and/or depending on the computing device of an embodiment. FIG. 2 illustrates the main process 42. FIGS. 3 and 4 illustrates subroutines 44, 46 called upon by the main process 42.

Beginning in FIG. 2 at the start block 48 of the main process 42, the software waits for a user to enter a number (block 50). While inputting a number, the user may indicate whether the entered number is an exact number (infinite precision) or a measured value (limited precision). The default is to assume the number entered is a measured value, unless the user indicates otherwise. However, such default could be reversed to make an exact number the default, which is what most conventional calculators are limited to. If the user pressed the EXACT soft key 52 (shown in FIG. 5), the exact indicator is displayed on the screen along with the entered number (e.g., see FIG. 7). The EXACT key 52 may be pressed at any time while the user inputs the number (i.e., before, during, or after entering the complete number). The software also waits for an operation key to be pushed to signify the completion of entering the number (block 54). In the preferred embodiment, the operation keys include: ENTER, ×, ÷, ^, −, and +. When an operation key is pressed, and thus the complete number has been entered, the number of significant figures for the entered number is computed (subroutine block 56).

The "compute significant figures of number" block 56 refers to the subroutine flowchart 44 of FIG. 3. At the start (block 58) of the FIG. 3 flowchart, the first character of the entered number is evaluated. Also, the SigFig count variable and the potential SigFig count variable are each set to zero as an initialization (action block 60). The first character is evaluated to determine whether it is a "−" sign (decision block 62). If the first character is a "−" sign (negative sign indicating negative number), the next character of the entered number is evaluated. If the first character is not a "−" sign, it is then evaluated to determine whether it is an "E" character (decision block 64), which is used for scientific notation to represent "×10$^y$," where y is the number following "E." If the first character is not an "E," it is next determined whether the first character is a zero (decision block 66). If the first character is not a zero, it is then determined whether it is the end of the string indicator (decision block 68). If the end of string is not reached, the entered number is evaluated to determine whether a decimal point has been encountered yet (decision block 70). If a decimal point has been encountered already within the string of the entered number, the potential SigFig count variable is added to the SigFig count variable (action block 72). Then, the SigFig count variable is set to zero (action block 74). If a decimal point has not been encountered yet (decision block 70), the SigFig count variable is set to zero (action block 74).

Next, the first character is evaluated to determine whether it is a decimal point (decision block 76). If the first character is a decimal point, the software notes or registers that a decimal point has been encountered (action block 78). Then, the next character of the entered number is retrieved for evaluation (action block 80). If the first character is not a decimal point (decision block 76), the SigFig count variable is incremented by one (action block 82), and then the next character is retrieved for evaluation (action block 80).

Referring back to the "Is character a "0"?" decision block 66, if the first character is a zero, then the SigFig count variable is evaluated to determine whether the SigFig count is greater than zero (decision block 84). If the SigFig count is greater than zero, then the potential SigFig count is incremented by one (action block 86), and then the next character is retrieved for evaluation (action block 80). If the SigFig count is not greater than zero (decision block 84), then the next character is retrieved for evaluation (action block 80).

Referring back to the "Is character an "E"?" decision block 64, if yes and the first character is an "E," then the SigFig count is evaluated to determine whether it equals zero (decision block 88). If the SigFig count variable does not equal zero, then it is determined whether there was a decimal point already (decision block 90). If there was already a decimal point, the potential SigFig count is added to the SigFig count (action block 92), and then the subprogram is finished (block 94) and returns to the main process 42 (FIG. 2) at block 56 with the value in the SigFig count variable, which is the computed number of significant figures for the entered number. Backing up one step to decision block 90 in FIG. 3, if there was not a decimal point encountered, then the subprogram is finished (block 94) and returns to the main process 42 (FIG. 2) at block 56 with the value in the SigFig count variable. However, backing up two steps to decision block 88 in FIG. 3, if the SigFig count equals zero, the character is evaluated to determine whether it is the first character (decision block 96). If it is the first character, the SigFig count variable is set to equal one (action block 98). If the currently evaluated character is not the first character (decision block 96), then the "Was there a decimal point?" decision block 90 is performed (as described above).

Referring back to the "End of string?" decision block 68 in FIG. 3, if the end of string is encountered, then the "Was there a decimal point?" decision block 90 is performed (as described above). At this point, all flow routes for the FIG. 3 subroutine flowchart 44 have been described. Referring again to the main process 42 of FIG. 2, after the number of significant figures for the entered number is determined (block 56), it is determined whether the user presses the EXACT soft key (decision block 100). This step is needed because the user may have edited the entered number and during such editing pressed the EXACT soft key. If the EXACT key was not pressed, the number of significant figures for the entered number is displayed on screen simultaneously with the entered number (display action block 102).

This simultaneous display of the entered number along with its number of significant figures (block 102) provides information that may educate, reassure, or remind the user of the number of significant figures for the entered number. Such information may be a valuable in teach a student, for example, about significant figures by allowing the student to enter examples into the calculator 40. Also, such information may be valuable as a self-teaching aid or as a reminder for a person trying to learn about or refresh his/her memory regarding significant figures.

After displaying the number of significant figures for the entered number (block 102), or after it is determined in decision block 100 that the user did press the EXACT soft key, it is determined whether the operation was an ENTER operation (decision block 104) (i.e., the user pressed the ENTER key on the calculator (see FIG. 1) after inputting the number). If the operation is not an ENTER operation, the operation character is displayed (display action block 106), and then the software waits for the next number or operand to be input by the user (block 50). If the operation is an ENTER operation (decision block 104), the calculator 40 computes the floating point answer (action block 108). Because the computation of a floating point answer by a computing device for mathematical operations is well known to those of ordinary skill in the art, the details of this process are not described herein.

After the floating point answer is computed (action block 108), it is displayed on the screen (display action block 110). Next (or simultaneously to the computation of the floating point answer), the number of significant figures for the answer is determined (subroutine block 112).

The "compute significant figures for answer" block 112 refers to the subroutine flowchart 46 of FIG. 4. At the start (block 114) of the FIG. 4 flowchart, the individual operators for the mathematical operation are evaluated to determine whether there are any multiplication, division, and/or to the power of operations (decision block 116). If there are no multiplication, division, or to the power of operations (e.g., only addition and/or subtraction operations), it is determined whether there is more than one group (decision block 118). That is, the mathematical operation is divided into "groups" separated by addition or subtraction operations ("groups" correlate to the mathematical concept of "terms"). For example in the mathematical operation of 3.452+5.93−1.007, there will be three "groups" ((3.452)+(5.93)−(1.007)): the first "group" being (3.452), the second "group" being (5.93), and the third "group" being (1.007). The grouping becomes more relevant with mixed mathematical operations (discussed below). Hence, in the case where there are no multiplication, division, or to the power of operations, it is unlikely that there will not be more than one group.

When there is more than one "group" (decision block 118), the next step is to determine the precision of each "group" (action block 120). Next the least precise group is identified and noted (action block 122). Then, the addition and/or subtraction operations are performed on the groups resulting in a floating point answer (action block 124) (note: this step may occur while computing the floating point answer or it may be performed again for the purpose of obtaining the rounded answer). Next, the floating point answer is rounded to match the precision of the least precise group (action block 126). For example, if the least precise group is precise to the tenths (1/10), then the floating point answer is rounded to the nearest tenths place.

Next, the number of significant figures for the rounded answer is determined (subroutine block 56), which may be performed using the process 44 of FIG. 3. At this point for this route through the FIG. 4 flowchart 46, the FIG. 4 subroutine 46 is finished and the rounded answer and its number of significant figures are returned to the main process 42 of FIG. 2.

Referring back to the "Were there any *, /, or ^ operations" decision block 116 of FIG. 4, if yes and there is a multiplication, division, and/or to the power of operation in the mathematical operation, the next step is to group each set of contiguous multiplication, division, and/or to the power of operations (action block 128). That is, as described above, the mathematical operation is divided into "groups" separated by addition or subtraction operations. For example in the mathematical operation of $5.23^2 \times 3.14159 + 0.93/2.5 - 1.007$, there will be three "groups" $((5.23^2 \times 3.14159) + (0.93/2.5) - (1.007))$: the first "group" being $(5.23^2 \times 3.14159)$, the second "group" being $(0.93/2.5)$, and the third "group" being $(1.007)$. Then, the operations for each group are separately performed (action block 130). For each group the smallest number of significant figures among the group's operands is determined and stored along with the floating point result for that group (note: this step may occur within or in addition to the step of computing the floating point answer (computation block 108) shown in FIG. 2). This step is repeated until all the groups are processed (see "Are there more groups?" decision block 132 and "Look at next group" action block 134 in FIG. 4).

Note that there may be only one group. For example in the mathematical operation of $6.834^2 \times 3.14159$, there is only one group because there are no addition or subtraction operations. After all the groups are processed, the next step is the "Is there more than one group" decision block 118, which was described above. At this point, if there is more than one group (i.e., it is a mix mathematical operation also having addition and/or subtraction operations), the mathematical operation is essentially the same as that described above for the case of addition and/or subtraction only. In other words, because all of the multiplication, division, and/or to the power of operations for each "group" have already been performed, the mathematical operation is reduced to addition and/or subtraction operations, which have been described above. If there is only one group, the floating point answer for that group is rounded to the smallest number of significant figures stored for that group in a prior step 130 (action block 136). At the end of the FIG. 4 process flow 46, in either case, the properly rounded answer along with its number of significant figures is returned to the main process 42 of FIG. 2.

Note that the "Compute Floating Point answer" block 108, the "Display Floating Point answer" block 110, and the "Compute Significant Figures for Answer" block 112 of FIG. 2 may vary in their respective order and/or may be performed simultaneously and/or integrally. Likewise, as will be apparent to one of ordinary skill in the art in light of this disclosure, the order of the steps for any of the processes of FIGS. 2–4 may vary or may become integrated in a variety of equivalent ways to perform the same core functions to achieve the same results.

Referring to FIG. 1 again, the calculator 40 of the preferred embodiment is just one example of a computing device having a software application in accordance with the present invention. As is well known to those of ordinary skill in the art, a computing device, such as a calculator or a personal computer for example, comprises (but is not limited to) an electrical circuit 137 having a processor 139 electrically coupled to a memory device 141, as well as a display screen 138 and an input device 140 electrically coupled to the electrical circuit. For illustration purposes, the electrical circuit 137 is shown schematically outside of the calculator 40, even though the electrical circuit 137 is actually within and a part of the calculator 40 in this example. A computing device also comprises at least one software application stored in the memory device 141 that is adapted to be executed by the processor 139. The processor 139, memory device 141, display screen 138, input device 140, and software application, each may vary for a given application. Consider the following examples illustrating some variations of these components for a variety of computing devices, which are just a few examples and are not intended to limit the scope of a claimed invention herein.

As shown in FIG. 1, a computing device may be a portable, handheld-size scientific calculator 40. Such a calculator 40 may be battery powered, solar powered, and/or powered by an AC/DC converter that can be plugged into an AC wall outlet. In FIG. 1, the display screen 138 of the calculator 40 has a liquid crystal display (LCD). The memory device 141 comprises a flash memory device, which stores the software application, among other tasks. The input device 140 comprises a keypad device with a variety of buttons. The input device also comprises "soft keys" 142, which are buttons 144 whose function may change to suit a given software application. For example, in FIG. 5, five soft keys 142 are displayed on the screen 138. If the user presses a button 144 below the displayed soft key 142, it will provide the input displayed on the soft key 142. Hence in FIG. 5, if a user presses the button 146 below the EXACT soft key 148, such button depression will be interpreted by the software application as the user's desire to designate the number being entered as an exact value (i.e., not a measured value—infinite precision).

As another example, the computing device may be a desktop computer (not shown) with a cathode ray tube monitor (not shown) as the display screen and with a standard keyboard (not shown) as the input device. For the desktop computer, the processor 139 may be a Texas Instruments® DSP chip, an Intel® Pentium® microprocessor, or an AMD® Athion® microprocessor, for example. The memory device 141 may be a double data rate (DDR) synchronous dynamic random access memory (SDRAM) memory module (not shown) and/or a magnetic hard drive device (not shown), each electrically coupled to an electrical circuit, which in this case comprises a motherboard (not shown). The computing device may be adapted to connect to a television (not shown), so that the television provides a display screen.

Similarly, the computing device may be a laptop personal computer (not shown), a palm-size computing device (not shown), or in general, handheld portable computing device. The display screen may comprise a LCD device or an active matrix display device (not shown). The display screen and the input device may be integral with one another. For example, if the display screen comprises a touch sensitive screen (not shown) that allows inputs to be received by touching the screen with a finger or a touch wand (not shown), the input device may be a simulated keypad displayed on the touch sensitive screen. Such displays are often used in portable palm-sized computer devices for example.

The present invention may also be embodied in an computing device structured as an application service provider (ASP) model. For example, a server (not shown) may provide an electrical circuitry that comprises the processor, memory, and software application. A terminal (not shown), located remotely from the server and connected to the server via a network connection (not shown), may provide the display screen (e.g., monitor, television) and input device (e.g., mouse, keyboard, keypad device). Hence, the software application at the server may receive the number inputs from a user at the input device of the remote terminal via a network connection. Then, the server may send the results and display information to be displayed at the remote terminal via the network connection. The network connection may comprise a local area network (LAN), a wide area network (WAN), the Internet, and/or a dedicated phone line. The network connection may also be a secure connection using encryption technology to encrypt and decrypt the packets of data.

FIGS. 5–24 are screenshots from the calculator embodiment 40 of FIG. 1 having the software application described in the flowcharts 42, 44, and 46 of FIGS. 2–4. The screenshots of FIGS. 5–24 illustrate the display shown to a user while using the calculator 40 of the preferred embodiment for various example mathematical operations. The following examples will briefly describe the actions of a user and the results provided by the calculator embodiment 40 to illustrate the some uses of the preferred embodiment of the present invention. The detailed steps described above for the flowcharts 42, 44, and 46 of FIGS. 2–4 correspond to the instructions and logic provided by the software application and performed by the processor within the calculator to provide the displayed results.

Figure 5:
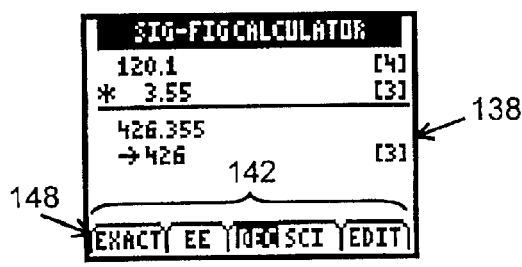
FIGS. 5–24 are screenshots from the calculator of FIG. 1 to illustrate some of the various uses of the preferred embodiment in accordance with the present invention.

FIG. 5 shows an example of a mathematical operation having multiplication only. To perform the mathematical operation of FIG. 5, the user first inputs the measured value of 120.1 into the calculator via the key pad 140 (see FIG. 1), then the user presses the multiplication operation button (×). At this point the calculator determines the number of significant figures for the first entered number and displays the number of significant figures for the first entered number, as well as the multiplication operator (*) (see FIG. 5). Next the user inputs the second operand, which is a measured value of 3.55, and then presses the ENTER button on the keypad. Now the calculator computes the floating point answer for the mathematical operation, which is 426.355. Also, the calculator computes the properly rounded answer (426) and its number of significant figures (3). The rounded answer and its number of significant figures are then displayed together on the screen simultaneously. FIG. 5 is the resulting screenshot at the conclusion of the mathematical operation. Note that of the two measured value operands in this case, the least number of significant figures was three, and hence the floating point answer was rounded to three significant figures in accordance with the rules for rounding to the proper number of significant figures (rules described above in the Background section).

Figure 6:
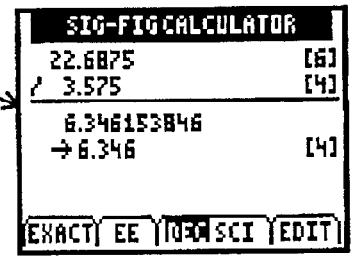

FIG. 6 shows an example of a mathematical operation having division only. To perform the mathematical operation of FIG. 6, the user first inputs the measured value of 22.6875 into the calculator 40 via the key pad 140 on the calculator, then the user presses the division operation button (÷). At this point the calculator 40 determines the number of significant figures for the first entered number and displays the number of significant figures for the first entered number, as well as the division operator (/) (see FIG. 6). Next the user inputs the second operand, which is a measured value of 3.575, and then presses the ENTER button on the keypad 140. Now the calculator 40 computes the floating point answer for the mathematical operation, which is 6.346153846. Also, the calculator computes the properly rounded answer (6.346) and its number of significant figures (4). The rounded answer and its number of significant figures are then displayed together on the screen 138 simultaneously. FIG. 6 is the resulting screenshot at the conclusion of the mathematical operation. Note in this case that of the two measured value operands, the least number of significant figures was four, and hence the floating point answer was rounded to four significant figures in accordance with the rules for rounding to the proper number of significant figures.

Figure 7:
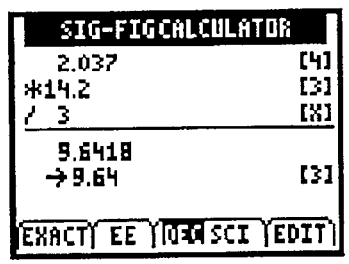

FIG. 7 shows an example with multiplication and division, but note that the third operand (3) is an exact value. Because the default for this embodiment is that each number entered is a measured value, the user must press the EXACT soft key sometime after pressing the division button (÷) and before pressing the ENTER button when inputting the third operand in the keypad 140 to inform the calculator 40 that this is an exact value. Thus, when computing the properly rounded answer (9.64), the number of significant figures for the third operand does not affect the rounding of the floating point answer. In other words, note in this case that of the two measured value operands (2.037 and 14.2), the least number of significant figures was three, and hence the floating point answer was rounded to three significant figures in accordance with the rules for rounding to the proper number of significant figures.

Figure 8:
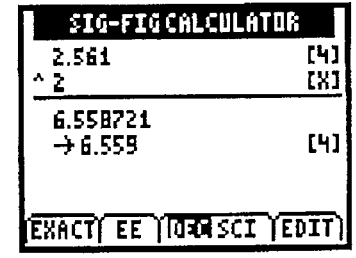

FIG. 8 shows an example of performing a mathematical operation to raise a measured number to the power of an exact number. Again, the number of significant figures for the exact number does not affect the number of significant figures for the answer.

Figure 9:
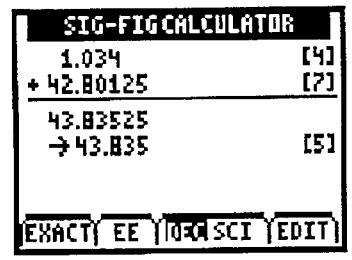
Figure 10:
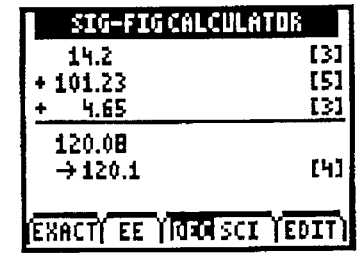

FIGS. 9 and 10 show examples of performing mathematical operations having only addition. Note that in these cases, because there is an addition operation involved, the floating point answer is rounded according to the least precise operand, as opposed to the least number of significant figures for the examples shown in FIGS. 5–8. The number of significant figures for the properly rounded answer is displayed along with or simultaneously with the rounded answer. In FIG. 9, the least precise operand is the first operand (1.034), which is precise to the thousands place ($\frac{1}{1000}$). Hence, the floating point answer (43.83525) is rounded to the nearest thousands to provide the rounded answer (43.835). Similarly in FIG. 10, the least precise operand also happens to be the first operand (14.2), which is precise to the tenths place ($\frac{1}{10}$). Hence, the floating point answer (120.08) is rounded to the nearest thousands to provide the rounded answer (120.1). Thus, the user is informed, educated, or at least reminded of the precision of the properly rounded answer as well as the number of significant figures for the answer.

Figure 11:
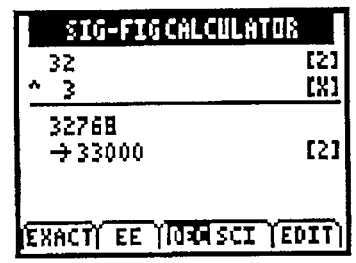
Figure 12:
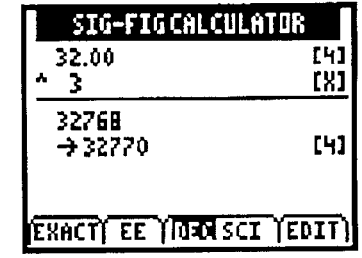

Comparing FIGS. 11 and 12 illustrates the difference in significant figures for the first operand (32) when the decimal point and zeros after the decimal point are used. Even though the value is the same in both examples (i.e., 32), the number of significant figures, which is related to the precision of the measured number, differs and thus the rounded answer varies accordingly. In FIG. 11 the rounded answer (33,000) is rounded to have only two significant figures, whereas the rounded answer of FIG. 12 (32,770) is rounded to have four significant figures to reflect the higher precision of the first operand (32.00) in FIG. 12.

The calculator 40 and software application forming the preferred embodiment provides the ability to enter values and display the results in decimal mode or scientific mode. Note in the screenshots that there are two soft keys indicated in the display, one labeled "DEC" for decimal mode and the other labeled "SCI" for scientific mode. Each of these modes can provide different perspectives on the entered numbers and thus provide additional educational benefits to a user.

Figure 13:
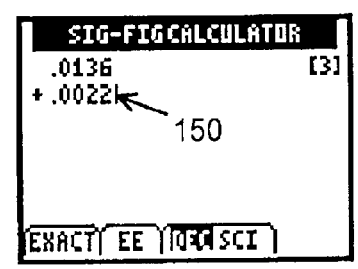
Figure 14:
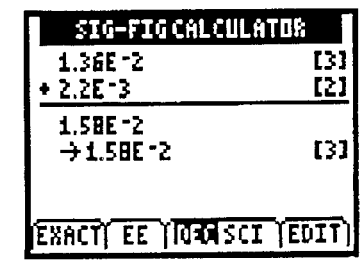

In the preferred embodiment, entered numbers between −1 and 1 (except 0) are displayed in scientific notation, regardless of the display mode chosen. This is illustrated in FIGS. 13 and 14. FIG. 13 shows the first two operands as they are being entered in decimal mode, i.e., before the ENTER operation is engaged (before pressing the enter button). In FIG. 13, the blinking cursor 150 is shown immediately after the second operand (0.0022), which appears as a vertical line in the frozen screenshot. FIG. 14 shows the result of the automatic transformation of the decimal-mode-entered values between −1 and 1 to scientific notation when the ENTER operation is engaged and the answers are generated. Hence, the decimal mode first operand (0.0136) is translated into scientific notation (1.36E-2), which is the same as $1.36 \times 10^{-2}$, and the decimal mode second operand (0.0022) is translated into scientific notation (2.2E-3). Also, the answer is shown in scientific notation (1.58E-3) because it is a value between −1 and 1.

Figure 15:
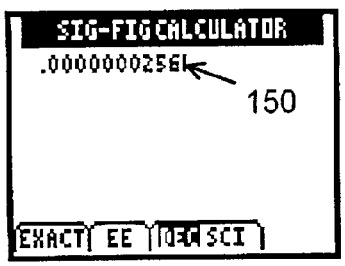
Figure 16:
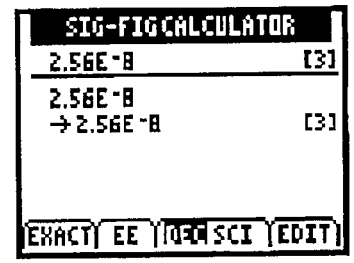

FIGS. 15 and 16 show another example of a decimal-mode-entered number between −1 and 1 being translated to scientific mode. Another thing to note about FIG. 16 is a feature of the preferred embodiment that enables a user to enter a single number to compute and display its number of significant figures. So for example in FIGS. 15 and 16, suppose a user wants to know or verify the number of significant figures for the number 0.0000000256. The user can enter the number (as shown in FIG. 15 with the cursor 150 at the end of the number) and press the ENTER key (rather than a mathematical operator). By pressing ENTER without a mathematical operator, the entered number is restated along with its number of significant figures (as shown in FIG. 16). Therefore, this feature provides yet another educational tool for the case where a user wants to know the number of significant figures for a number but does not need to perform a mathematical operation.

Figure 17:
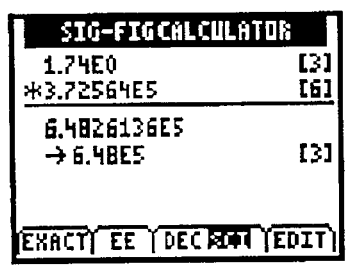

FIG. 17 shows an example of a mathematical operation performed with the calculator 40 in scientific display mode. In the scientific mode, the numbers are entered and displayed in scientific mode. Also, the floating point and rounded answers are displayed in scientific notation.

Figure 18:
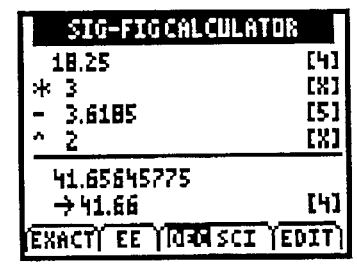
Figure 19:
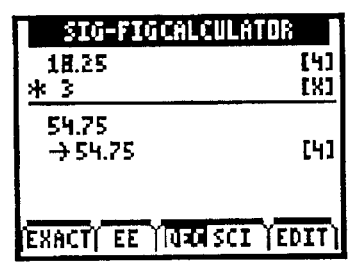
Figure 20:
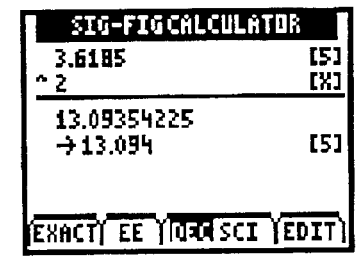
Figure 21:
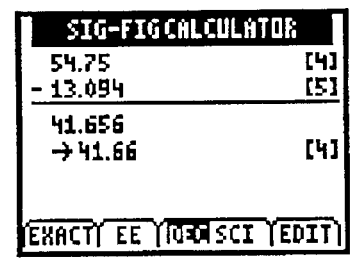

FIG. 18 shows an example of a mixed mathematical operation (i.e., involving multiplication, subtraction, and to the power of operations together). As described above regarding the flowcharts 42, 44, and 46 of FIGS. 2–4, the software application divides the operands into groups of consecutive multiplication, division, and/or to the power of operations separated by addition and/or subtraction operations. Hence, in the example of FIG. 18, the first group is 18.25×3, and the second group is $3.6185^2$. To reach the result, the software first computes the operations within the first group and within the second group, respectively. Then, the floating point results for each group are subtracted to obtain the final floating point answer (41.656). Although the calculator 40 of the preferred embodiment does not show the steps of FIGS. 19–21, the individual computations that occur within the software application are shown for illustration purposes in FIGS. 19–21. FIG. 19 illustrates the computation of the first group (18.25×3). The computation of the second group ($3.6185^2$) is illustrated in FIG. 20. The results of the first group and the second group are subtracted, as illustrated in FIG. 21, which yields the same floating point and rounded results as shown in FIG. 18.

Figure 22:
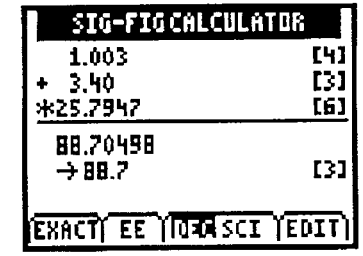
Figure 23:
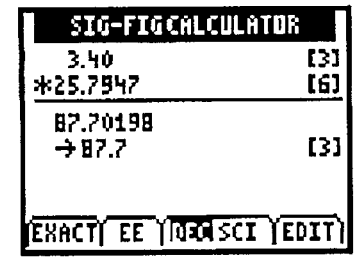
Figure 24:
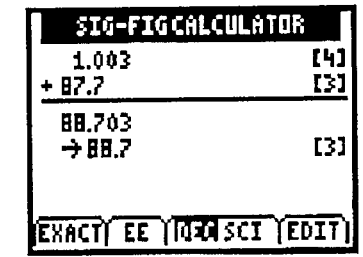

Similarly, FIG. 22 is another example of a mixed mathematical operation, and FIGS. 23 and 24 illustrate the individual steps of grouping and computing each group not normally shown during the computation of the mathematical operation of FIG. 22. In another possible embodiment, it may be desirable to show these intermediate steps for educational purposes.

It will be appreciated by those skilled in the art having the benefit of this disclosure that this invention provides a way to determine and display the number of significant figures for an entered number and/or a properly rounded answer on a screen along with the entered number(s) and the rounded answer. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A computing device comprising:
   an electrical circuit comprising:
      a processor, and
      a memory device electrically coupled to the processor;
   a display screen electrically coupled to the electrical circuit;
   an input device electrically coupled to the electrical circuit; and
   a software application stored in the memory device, and when executed by the processor, the software application being adapted to provide instructions to:
      determine the number of significant figures for a number entered via the input device, and
      simultaneously display on the display screen the entered number along with the number of significant figures for the entered number.

2. The computing device of claim 1, wherein the computing device is a calculator.

3. The computing device of claim 2, wherein the display screen comprises a liquid crystal display device.

4. The computing device of claim 2, wherein the input device comprises a keypad on the calculator.

5. The computing device of claim 1, wherein the computing device is a handheld portable computing device.

6. The computing device of claim 5, wherein the display screen comprises a touch sensitive screen, and wherein the input device comprises a simulated keypad displayed on the touch sensitive screen, such that a user can input a number or mathematical operator by contacting the touch sensitive screen with a touch wand.

7. The computing device of claim 1, wherein the computing device is a laptop computer.

8. The computing device of claim 1, wherein the computing device is a desktop computer.

9. The computing device of claim 1, wherein the computing device comprises a server and a terminal, the computing device being structured in an application service provider model such that the terminal is remotely located from the server, the display screen and input device being parts of the terminal, the electrical circuitry being part of the server, and the display screen and input device being electrically coupled to the electrical circuit via a network connection.

10. The computing device of claim 9, wherein the network connection comprises the Internet.

11. The computing device of claim 9, wherein the network connection comprises a local area network.

12. The computing device of claim 1, wherein the software application is further adapted to provide instructions to determine the number of significant figures for a second number entered via the input device, and simultaneously display on the display screen the second entered number along with the number of significant figures for the second entered number.

13. The computing device of claim 12, wherein the software application is further adapted to provide instructions to:
calculate a floating point answer for a mathematical operation entered, wherein the entered numbers are the operands,
determine the proper number of significant figures for the floating point answer based on the number of significant figures for each of the operands,
round the floating point answer to the proper number of significant figures for the answer, and
simultaneously display on the display screen the rounded answer along with the number of significant figures for the rounded answer.

14. The computing device of claim 13, wherein the software application is further adapted to provide instructions to simultaneously display the floating point answer on the display screen along with the rounded answer and the number of significant figures for the rounded answer.

15. The computing device of claim 12, wherein the software application is further adapted to provide instructions to:
calculate a floating point answer for a mathematical operation entered, wherein the entered numbers are the operands,
determine which of the operands is least precise,
round the floating point answer to least precision of the operands,
determine the number of significant figures for the rounded answer, and
simultaneously display on the display screen the rounded answer along with the number of significant figures for the rounded answer.

16. The computing device of claim 1, wherein the memory device comprises a flash memory device.

17. The computing device of claim 1, wherein the memory device comprises a hard drive.

18. The computing device of claim 1, wherein the memory device comprise a synchronous dynamic access memory (SDRAM) device.

19. A computing device comprising:
an electrical circuit comprising:
a processor, and
a memory device electrically coupled to the processor;
a display screen electrically coupled to the electrical circuit;
an input device electrically coupled to the electrical circuit; and
a software application stored in the memory device, and when executed by the processor, the software application being adapted to provide instructions to:
calculate a floating point answer for a mathematical operation entered for one or more numbers entered into the computing device via the input device,
if there is an addition and/or subtraction operation within the entered mathematical operation,
determine the proper precision for the floating point answer based on the entered numbers,
round the floating point answer to the proper precision,
determine the number of significant figures for the rounded answer, and
simultaneously display on the display screen the rounded answer and the number of significant figures for the rounded answer; and
if there are no addition or subtraction operations within the entered mathematical operation,
determine the proper number of significant figures for the floating point answer based on the entered numbers,
round the floating point answer to the proper number of significant figures, and
simultaneously display on the display screen the rounded answer and the number of significant figures for the rounded answer.

20. A portable handheld calculator comprising:
a processor;
a memory device electrically coupled to the processor;
a display screen electrically coupled to the processor;
a keypad input device electrically coupled to the processor; and
a software application stored in the memory device, and when executed by the processor, the software application being adapted to provide instructions to:
determine the number of significant figures for a first number entered via the keypad input device,
simultaneously display on the display screen the first entered number along with the number of significant figures for the first entered number,
determine the number of significant figures for a second number entered via the keypad input device,
simultaneously display on the display screen the second entered number along with the number of significant figures for the second entered number,
calculate a floating point answer for a mathematical operation entered, wherein the entered numbers are the operands,
if there is an addition and/or subtraction operation within the entered mathematical operation,
determine the proper precision for the floating point answer based on the entered numbers, round the floating point answer to the proper precision, determine the number of significant figures for the rounded answer, and simultaneously display on the display screen the rounded answer and the number of significant figures for the rounded answer; and if there are no addition or subtraction operations within the entered mathematical operation, determine the proper number of significant figures for the floating point answer based on the entered numbers, round the floating point answer to the proper number of significant figures, and simultaneously display on the display screen the rounded answer and the number of significant figures for the rounded answer.

21. A method of displaying an answer for a mathematical operation on a display screen of a computing device, the method comprising the steps of:

calculating a floating point answer for a mathematical operation entered for one or more numbers entered into the computing device, if there is an addition and/or subtraction operation within the entered mathematical operation, determining the proper precision for the floating point answer based on the entered numbers, rounding the floating point answer to the proper precision, determining the number of significant figures for the rounded answer, and simultaneously displaying on the display screen the rounded answer and the number of significant figures for the rounded answer, and if there are no addition or subtraction operations within the entered mathematical operation, determining the proper number of significant figures for the floating point answer based on the entered numbers, rounding the floating point answer to the proper number of significant figures, and simultaneously displaying on the display screen the rounded answer and the number of significant figures for the rounded answer.

22. The method of claim 21, further comprising the steps of:

determining the number of significant figures for a first number entered into the computing device;

simultaneously displaying on the display screen the first entered number along with the number of significant figures for the first entered number;

determining the number of significant figures for a second number entered into the computing device; and simultaneously displaying on the display screen the second entered number along with the number of significant figures for the second entered number.

23. The method of claim 21, further comprising the step of:

simultaneously displaying on the display screen the floating point answer along with the rounded answer and the number of significant figures for the rounded answer.

24. A method of displaying an entered number on a display screen of a computing device, the method comprising the steps of:

determining the number of significant figures for a number entered into the computing device; and simultaneously displaying on the display screen the entered number along with the number of significant figures for the entered number.

25. A computer program adapted to be executed by a computing device, the computer program comprising a method of displaying an answer on a display screen of the computing device for a mathematical operation performed by the computing device, the method comprising the steps of:

calculating a floating point answer for a mathematical operation entered for one or more numbers entered into the computing device, if there is an addition and/or subtraction operation within the entered mathematical operation, determining the proper precision for the floating point answer based on the entered numbers, rounding the floating point answer to the proper precision, determining the number of significant figures for the rounded answer, and simultaneously displaying on the display screen the rounded answer and the number of significant figures for the rounded answer, and if there are no addition or subtraction operations within the entered mathematical operation, determining the proper number of significant figures for the floating point answer based on the entered numbers, rounding the floating point answer to the proper number of significant figures, and simultaneously displaying on the display screen the rounded answer and the number of significant figures for the rounded answer.

26. The computer program of claim 25, wherein the method further comprises the steps of:

determining the number of significant figures for a first number entered into the computing device;

simultaneously displaying on the display screen the first entered number along with the number of significant figures for the first entered number;

determining the number of significant figures for a second number entered into the computing device; and simultaneously displaying on the display screen the second entered number along with the number of significant figures for the second entered number.

27. The computer program of claim 25, wherein the method further comprises the steps of:

simultaneously displaying on the display screen the floating point answer along with the rounded answer and the number of significant figures for the rounded answer.

28. A computer program adapted to be executed by a computing device, the computer program comprising a method of displaying an entered number on a display screen of the computing device, the method comprising the steps of:

determining the number of significant figures for a number entered into the computing device; and simultaneously displaying on the display screen the entered number along with the number of significant figures for the entered number.

* * * * *